United States Patent [19]
Kalka et al.

[11] 3,993,536
[45] Nov. 23, 1976

[54] METHOD FOR PREPARING SYNTHETIC POWDERS BASED ON POLYVINYL CHLORIDE OR VINYL CHLORIDE COPOLYMERS CONTAINING EMULSIFIERS

[75] Inventors: Josef Kalka, Herten; Hermann Winter, Marl; Manfred Smolinski, Marl; Hans-Georg Wolf, Marl, all of Germany

[73] Assignee: Chemische Werke Hüls Aktiengesellschaft

[22] Filed: Sept. 11, 1974

[21] Appl. No.: 505,045

[30] Foreign Application Priority Data
Sept. 14, 1973 Germany............................ 2346274

[52] U.S. Cl. ........................... 159/48 R; 159/4 MS; 159/DIG. 10
[51] Int. Cl.² ........................................... B01D 1/16
[58] Field of Search ........... 159/4 B, 48 R, DIG. 10; 241/1, 5

[56] References Cited
UNITED STATES PATENTS

| | | |
|---|---|---|
| 2,297,726 | 10/1942 | Stephanoff ........................... 159/4 J |
| 2,413,420 | 12/1946 | Stephanoff ........................... 159/4 B |
| 2,880,794 | 4/1959 | Marshall, Jr. ...................... 159/48 R |
| 3,038,533 | 6/1962 | Comings et al. ..................... 159/4 B |
| 3,805,869 | 4/1974 | Winter et al. ........................ 159/4 B |
| 3,840,188 | 10/1974 | Coombe et al. .......................... 241/5 |

Primary Examiner—Jack Sofer
Attorney, Agent, or Firm—Gilbert L. Wells

[57] ABSTRACT

The method of preparing synthetic powders containing emulsifiers having good paste qualities by spray-drying polymer dispersions through a two-fluid atomizer having a spray ratio of about 1.6 to 5.0 kg. of spray air for each kg. of dispersion is improved. The polymer dipersions are prepared by emulsifying vinyl chloride monomer or a mixture of vinyl chloride monomer and unsaturated polymerizable compounds and polymerizing the monomers to produce polymers and copolymers of vinyl chloride. The improvement in paste qualities of the powders is achieved by introducing the spray dried powder into an air jet having a velocity from about 330 to 550 meters per second and having a weight ratio of gas to solids ranging from 1:10 to 5:1.

5 Claims, 1 Drawing Figure

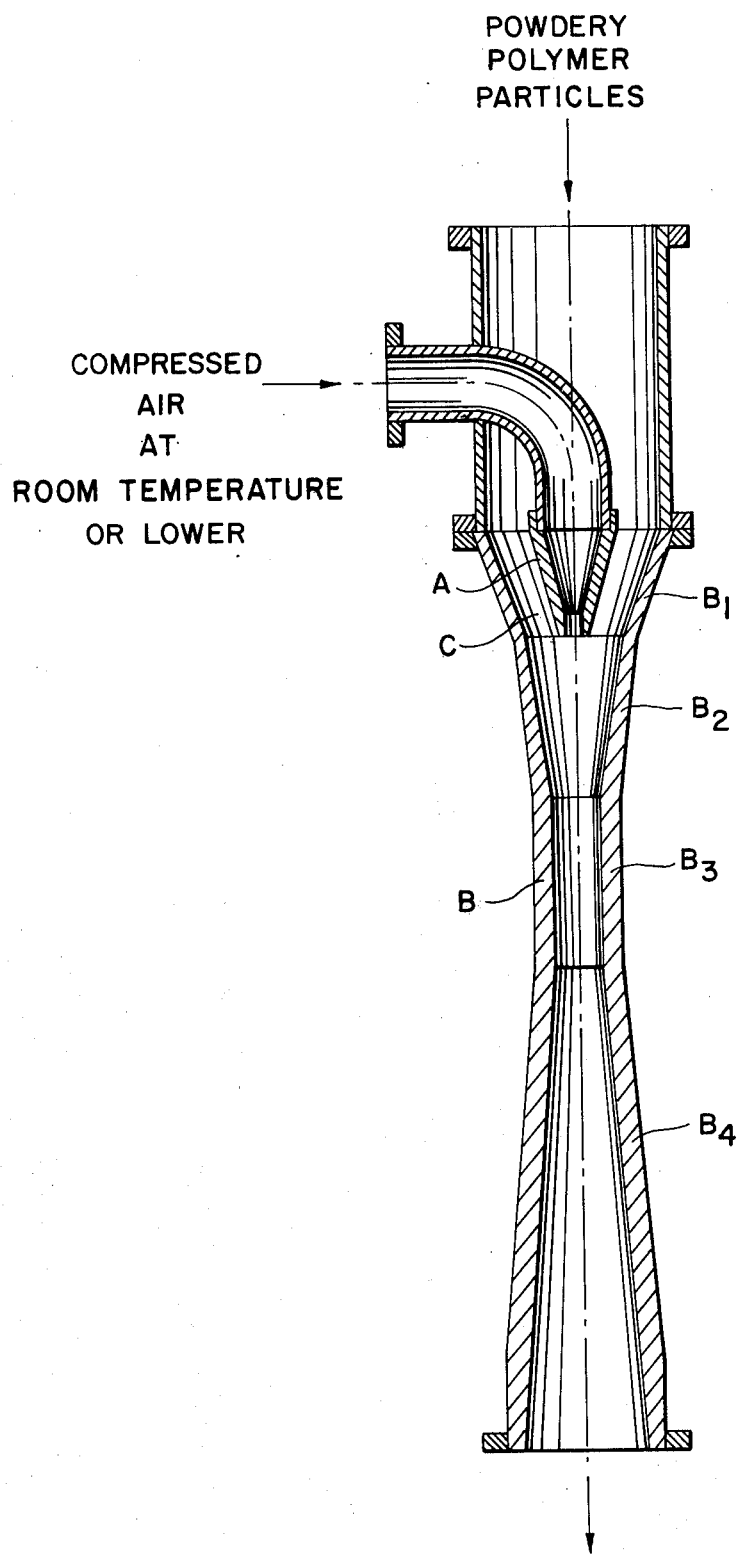

METHOD FOR PREPARING SYNTHETIC POWDERS BASED ON POLYVINYL CHLORIDE OR VINYL CHLORIDE COPOLYMERS CONTAINING EMULSIFIERS

CROSS REFERENCES TO RELATED APPLICATIONS

Applicants claim priority under 35 U.S.C. 119 for Application P 23 46 270.0, filed Sept. 14, 1973 in the Patent Office of the Federal Republic of Germany. The disclosure of assignee's copending application Ser. No. 288,972, filed Sept. 14, 1972 now U.S. Pat. No. 3,833,494, over which the present application is an improvement, is incorporated herein.

BACKGROUND OF THE INVENTION

The present invention relates to a method for preparing synthetic powders containing emulsifiers and endowed with good paste properties. These powders are prepared by spray-drying polymer dispersions by means of binary material nozzles and with a spray ratio of 1.6–5.0 kg. of spray air to each kg. of dispersion. The spray-dried powder is then treated with an air jet. The synthetic powders so obtained are particularly suitable for advantageous use in the preparation of platisols.

The state of the art of vinyl chloride polymer and copolymer emulsions useful in the present invention may be ascertained by reference to U.S. Pat. Nos. 3,627,717 and 3,732,178, and the Kirk-Othmer "Encyclopedia of Chemical Technology," 2nd Edition, Vol. 21, (1970) pages 369–412, particularly pages 373–374 where Emulsion Polymerization is disclosed, and pages 403–404 where Dispersion Resins which include plastisols and plastigels are disclosed. Kirk-Othmer states that plastigels are plastisols having high viscosities and yield values and that putty-like pastes may be prepared therefrom. The state of the art of spray drying, pneumatic atomizers and polyvinyl chloride polymer and copolymer powders produced therewith may be ascertained by reference to U.S. Pat. No. 3,805,869 and Kirk-Othmer, Vol. 7 (1965), pages 360–368 under the section entitled "Dispersion-Type Direct Dryers,"0 particularly pages 362–364 wherein spray dryers and pneumatic atomizers are disclosed. U.S. Pat. No. 3,805,869 discloses the preparation of uniform, finely divided powdery vinyl chloride polymer particles containing less than 2 weight percent particles having a diameter greater than 40 microns obtained by spray drying an aqueous dispersion of the polymer and a carrier gas through a two-fluid atomizer.

As disclosed by the state of the art, plastisols are dispersions of vinyl resins in plasticizer.

They are used in making molded bodies, for instance by using the centrifugal casting method, and for making coatings or layered materials using a painting method. Following molding, the plastisols are solidified by hot gelling.

A number of requirements must be met with regard to the properties of the plastisols and those of the powders suitable for plastisol preparation. These include:

a. The plastisols must remain intermixed, so that constant products with smooth surfaces are made at low cost. Hence special fineness of the synthetic powder to be dispersed is demanded. Generally such a powder should contain only slight amounts, such as less than 2 weight percent, exceeding 40 microns in diameter.

b. Furthermore, the pastes should be endowed with as flat a viscosity curve (viscosity dependence on the gradient of shear) as possible. Also, the level of viscosity curve should be as low as possible. These properties are especially significant with respect to the frequently applied process of rotational casting when making imitation leather or foam imitation leather.

c. Also, high bulk density is required of the powders used for paste preparation. This high density assumes good powder fluidity and causes good storage behavior while being transported.

d. Lastly, the powders should lend themselves to good pasting, in other words, the energy required when homogenizing powder and plasticizers should be as little as possible. Pasting behavior may be expressed in terms of the maximum energy required during homogenization, which must take place at a constant rate, and/or in terms of the time after which a certain amount of power is expended.

The industrially preferred method for the preparation of powders suitable for making plastisols is the spray-drying of polymer dispersions.

In this regard, the PVC dispersion may be sprayed by means of a two-fluid atomizer into a drying tower. The required hot air is introduced into the tower from the top. The dried product is obtained at the lower end of the tower. According to the related state of the art, as disclosed in U.S. Pat. No. 3,883,494, the spray ratio is 1.6–5.0 kg. of sprayed air to one kg. of dispersion. According to the method of U.S. Pat. No. 3,883,494 uniform, finely divided powdery vinyl chloride particles containing less than 2 percent by weight particles having a diameter greater than 40 microns are obtained.

This means that the powders ab initio are obtained in a fineness suitable for paste preparation. Hence they no longer require otherwise required air sifting. Sifting only occurs for removing any impurties that might be present and these impurities result from wall cakings of the spray tower. The powders prepared in conformity with the method of U.S. Pat. No. 3,805,869 evidence high bulk densities and good rheological behavior, but however, their pasting behavior needs to be improved.

SUMMARY OF THE INVENTION

Having in mind the limitations of the state of the art powders, such as disclosed in U.S. Pat. No. 3,883,494, now it was surprisingly found that the pasting behavior of the state of the art powders could be appreciably improved if the spray-dried powder is introduced into an air jet having a velocity of about 330–550 meters per second and having a weight ratio of gas to solid of 1:10 to 5:1. It is appropriate that the spray-dried powder be introduced into the air jet of a driving nozzle. Advantageously the spray ratio is about 1.7 – 3.0 kg. of nozzle air for each kg. of dispersion.

In a preferred embodiment of the process, the velocity of the gas jet amounts to 330 – 550 meters per second.

The weight ratio of gas to solid advantageously is about 2:10 to 8:10.

BRIEF DESCRIPTION OF THE DRAWING

Treatment of the dry powder in conformity with the invention and by means of a gas jet takes place in the apparatus shown in longitudinal section in the FIGURE of the drawing.

This apparatus consists of a driving nozzle A and a diffuser B. The gas jet is generated in the driving nozzle and passed through the diffuser. It attracts at C (by suction) the powder to be treated. The nozzle A orifice diameter is 5 – 50 mm, preferably from 10 to 25 mm. The terminal aperture diameter of the diffuser is 50 – 200 mm, preferably 80 – 120 mm, and the aperture diameter of middle part $B_3$ is from 10 to 80 mm, preferably 30 – 50 mm. The slope of cone $B_1$ should be 20°, that of cone $B_2$ should be 7°42′ and that of cone $B_4$ should be 3°49′.

In order to obtain the required speeds, the pressure from the driving nozzle A must exceed 1 atmosphere gauge, and preferably be 3 – 6 atmosphere gauge. The output from the apparatus is 0.1 to 15 metric tons per hour of PVC, especially from 2 to 8 metric tons per hour. Control of the powder rate occurs on account of the diffuser's suction effect and the mechanical (bucket wheel) or pneumatic displacement of the powder to the diffuser. Gas consumption amounts to 70 – 4,000 cubic meters at standard temperature and pressure of gas per metric ton of powder.

The air jet used to treat the powder is at room temperature or may be lower.

DESCRIPTION OF THE PREFERRED EMBODIMENTS

The technical improvement achieved by means of the method of the present invention with respect to the state of the art consists in solving the problem of the invention, i.e., in achieving an appreciably improved pasting behavior of the powder. However, the rheological behavior of the pastes made from the powders also is much improved.

Dispersions applicable to spray-drying purposes are vinyl chloride-homo or copolymer dispersions prepared in conventional manner by emulsion, polymerization as disclosed in U.S. Pat. Nos. 2,140,048; 3,627,717 and 3,732,178. Suitable comonomers include, but are not limited to vinyl acetate, vinylidene chloride, vinyl ether, acrylonitrile and acrylic acid ester. The comonomer may be present in a concentration up to 20 mole percent, preferably from 0.2 to 10 mole percent based on the copolymer.

All the conventional emulsifiers such as alkylsulfonates, alkylsulfates, alkylbenzol-sulfonates and salts of fatty acids used for emulsion-polymerization of vinyl chloride may be used.

The dispersions contain conventional amounts of emulsifiers, for instance 2 percent by weight, but also appreciably larger amounts, for instance 3 – 5 percent by weight, and further lesser amounts, for instance as little as 0.3 percent by weight based on the weight of the emulsion. The solid content of the dispersion also remains within conventional bounds. It is for instance 30 – 70 percent by weight, preferably it should be 45 – 60 percent by weight based on the weight of the emulsion.

Spraying takes place in spray drying towers of conventional design, such as disclosed by M. Kainer in "Polyvinylchloride and Vinylchloride Copolymers," as published by Springer-Verlage, Berlin/Heidelberg/New York (1965) at page 5.

Examples are given below for further description and explanation of the method of the present invention. These examples also show the improvement over the prior art.

EXAMPLE 1 (Comparative test)

26 binary material nozzles are used in a spray tower of conventional design and holding about 200 cubic meters. The dispersion to be sprayed contains 48 percent solids and 2 percent by weight of emulsifier with respect to PVC weight. The emulsifier is an alkylsulfonate with an average of 14 carbon atoms in the alkyl chain. The surface tension of the dispersion is 39 dyne/cm. The input temperature of the tower is 160° C, the output temperature is 65° C, the pressure of the spray air is 3.5 atmosphere gauge, the hot air rate is 22,000 cubic meters per hour at standard temperature and pressure. The spray ratio is 2.3 kg. of spray air for each kg. of dispersion, and the output per nozzle is 87 kg. of dispersion per hour.

The dried PVC powder is sifted through a sieve with a mesh size of 300 microns. The coarse particles eliminated amount to 0.3 percent by weight.

A paste is prepared from 65 parts by weight of the PVC powder so obtained and from 35 parts by weight of dioctylphthalate plasticizer and the viscosity is measured after 2 and 24 hours storage for various shear gradients by means of the Haake viscosimeter. The units of measurement are poise [(dyn . sec/cm$^2$) ]

The measurement was carried out in a Haake-Roto-Viskometer.

The measured paste viscosities are shown in Table 1 under "a" for 2 hours of storage and under "b" for 24 hours of storage. Column "c" shows the bulk density.

10 kg. of the same paste are prepared in a 25 liter Spangenberg mixer. 6.5 kg. of powder are added to 2.5 kg. of the plasticizer and 1.0 kg. of the plasticizer is poured over the mixture. Only then is the mixer turned on at 90 rpm. The mixer power, which is required for the homogenization of the mixture of powder and dioctylphthalate, is measured as a function of time. The values of the energy absorption of the mixer in watts after 0.5, 1.0, 1.5 and 3.0 minutes (the paste behavior) are listed in column 1 of Table 2.

EXAMPLE 2

The dry PVC powder prepared as in Example 1 is introduced into an air jet with a velocity of 420 meters per second in a driving nozzle A with an orifice diameter of 19.5 mm and the $B_3$ diameter of the diffuser is 40 mm. The driving nozzle A has the air pressure set at 3.9 atmosphere gauge and the PVC powder supply line is connected to the suction pipe of the nozzle. The flow rate is 6.0 metric tons of PVC powder per hour and 1,250 cubic meters of air per hour at standard conditions of temperature and pressure. The values for viscosity and paste behavior are shown on lines 2 in Tables 1 and 2. The ratio of gas to solid is 0.28.

EXAMPLES 3

One proceeds as in Example 2, however only 4.5 metric tons of PVC powder an hour are fed into the equipment by means of a bucket wheel. The results are shown on lines 3 of Tables 1 and 2. The ratio of gas to solid is 0.37.

EXAMPLE 4

One proceeds as in Example 2, however the pressure ahead of the driving nozzle is raised to 4.2 atmosphere gauge. The speed of the gas jet is 440 meters per second. On that account, the PVC powder rate falls to 3.0 metric tons an hour and the air rate rises to 1,350 cubic meters an hour at standard conditions. Lines 4 in Tables 1 and 2 show the values of viscosity, bulk density and paste behavior of the powders so prepared. The ratio of gas to solid is 0.63.

EXAMPLE 5

One proceeds as in Example 2, but a driving nozzle orifice diameter of 13 mm is used. The test results are shown on lines 5 of Tables 1 and 2.

EXAMPLE 6

One operates as in Example 1. A dispersion containing the same concentration in solids and of the same surface tension and also of the same emulsifier concentration as in Example 1 is used, however it was obtained by copolymerizing 95 percent PVC and 5 percent vinyl acetate. Test results are shown on lines 6 of Tables 1 and 2.

EXAMPLE 7

The copolymerisate obtained from Example 6 is treated by means of an air jet for the conditions listed in Example 4. Line 7 of both Tables shows the values of the paste behavior and viscosity. The ratio of gas to solids is 0.63.

We claim:
1. An apparatus for treating finely divided powdery vinyl chloride polymer particles, comprising:
   A. a converging driving nozzle having an orifice diameter of 5 to 50 mm; and
   B. a diffuser surrounding said driving nozzle having;
      a. a first converging conical section with a negative slope of 20°;
      b. a second converging conical section extending from said first conical section having a negative slope of 7°42′;
      c. a straight cylindrical section extending from said second conical section having an aperture diameter of 10 to 80 mm; and
      d. a third conical section extending from said cylindrical section having a positive diverging slope of 3°49′ and a terminal aperture diameter of 50 to 200 mm.
2. The apparatus of claim 1, wherein said orifice diameter of (A) is 10 to 25 mm and said terminal aperture diameter of (B) is 80 to 120 mm.
3. In a process for preparing powdery, emulsifier-containing vinyl chloride polymer particles suitable for use in the manufacture of plastisols by spray drying an aqueous dispersion of said polymer with a carrier gas through a two-fluid atomizer into a water-evaporating atmosphere comprising spraying with 1.6 – 5.0 kg. of carrier gas per kg. of said dispersion to form dry powdery polymer particles containing less then 2 weight percent particles having a diameter greater than 40 microns, the improvement comprising introducing said dry powdery polymer particles into a confined air stream in a two fluid nozzle, said air stream having a velocity of about 330 to 550 meters per second and having a weight ratio of gas to solids of about 1:10 to 5:1 and producing said powdery, emulsifier-containing vinyl chloride polymer particles.
4. The method of claim 3, wherein said air stream has a velocity of about 380 to 450 meters per second.
5. The method of claim 4, wherein said weight ratio of gas to solids is about 2:10 to 8:10.

| | | TABLE 1 | | | | TABLE 2 | | |
|---|---|---|---|---|---|---|---|---|
| | | Paste viscosity [poise] at 0.3/100 sec.⁻¹ after | | | | Paste behavior in watts after | | |
| Type of Example | Example No. | a) 2 hours | b) 24 hours | c) bulk density (gm/lit) | 0.5 | 1.0 | 1.5 | 3.0 minutes |
| comparative | 1 | 410/160 | 440/120 | 540 | 600 | 500 | 450 | 400 |
| per invention | 2 | 100/140 | 250/130 | 480 | 280 | 260 | 260 | 260 |
| per invention | 3 | 170/180 | 160/160 | 480 | 280 | 240 | 230 | 230 |
| per invention | 4 | 700/80 | 800/80 | 380 | 220 | 200 | 190 | 190 |
| per invention | 5 | 240/180 | 400/150 | 500 | 380 | 380 | 360 | 360 |
| comparative | 6 | 150/200 | 500/200 | 536 | 600 | 500 | 480 | 450 |
| per invention | 7 | 150/150 | 200/150 | 400 | 200 | 300 | 280 | 250 |